United States Patent
Prevost (10) Patent No.: US 11,965,583 B2
(45) Date of Patent: Apr. 23, 2024

(54) THRUST CHAIN DEVICE HAVING A TOOTHED SPROCKET WITH LONG ASYMMETRICAL TEETH

(71) Applicant: SERAPID FRANCE, Rouxmesnil-Bouteilles (FR)

(72) Inventor: Romain Prevost, Rouxmesnil-Bouteilles (FR)

(73) Assignee: SERAPID FRANCE, Rouxmesnil-Bouteilles (FR)

( * ) Notice: Subject to any disclaimer, the term of this patent is extended or adjusted under 35 U.S.C. 154(b) by 0 days.

(21) Appl. No.: 17/925,700

(22) PCT Filed: May 16, 2021

(86) PCT No.: PCT/FR2021/050845
§ 371 (c)(1),
(2) Date: Nov. 16, 2022

(87) PCT Pub. No.: WO2021/234253
PCT Pub. Date: Nov. 25, 2021

(65) Prior Publication Data
US 2023/0341031 A1    Oct. 26, 2023

(30) Foreign Application Priority Data

May 17, 2020   (FR) ..................................... 2004905

(51) Int. Cl.
*F16G 13/20*    (2006.01)
*B66F 3/06*     (2006.01)
(Continued)

(52) U.S. Cl.
CPC ........... *F16H 19/0636* (2013.01); *B66F 3/06* (2013.01); *F16G 13/20* (2013.01); *F16H 55/0806* (2013.01); *F16H 55/30* (2013.01)

(58) Field of Classification Search
CPC .. F16H 19/0636; F16H 55/0806; F16H 55/30; F16G 13/20; B66F 3/06
(Continued)

(56) References Cited

U.S. PATENT DOCUMENTS

| 4,521,993 A | 6/1985 | Tacheny et al. |
| 6,224,037 B1 | 5/2001 | Novick |
| 11,358,842 B2 | 6/2022 | Seigneur et al. |

FOREIGN PATENT DOCUMENTS

| EP | 1006074 A1 | 6/2000 |
| FR | 2780472 A1 | 12/1999 |

(Continued)

*Primary Examiner* — T. Scott Fix
(74) *Attorney, Agent, or Firm* — Volpe Koenig (57) ABSTRACT

Thrust chain device, includes a thrust chain with a straight portion along an axis and a curved portion, and links hinged on shafts, a chain guide, a driving sprocket with chain interlocking teeth, the sprocket being in contact with the chain via contact surfaces in the shape of an involute of a circle, the contact surfaces belonging to the teeth, a tooth engaging with the chain while defining a line of action having an angle with the shaft of the straight portion of between −10° and 10°, the sprocket in contact with the straight portion and not the curved and is mounted such that it can rotate on a shaft on the side of the chain opposite the curved portion's center of curvature, the contact surfaces including a convex front surface directed towards the straight portion and a rear surface directed towards the curved portion when the tooth is interlocking.

11 Claims, 8 Drawing Sheets

(51) Int. Cl.
*F16H 19/06* (2006.01)
*F16H 55/08* (2006.01)
*F16H 55/30* (2006.01)

(58) Field of Classification Search
USPC ........................................................ 74/89.21
See application file for complete search history.

(56) References Cited

FOREIGN PATENT DOCUMENTS

| | | | |
|---|---|---|---|
| FR | 2786476 A1 | 6/2000 | |
| FR | 3061753 A1 | 7/2018 | |
| WO | WO-2014199202 A1 * | 12/2014 | .............. F01C 1/082 |
| WO | WO-2015193809 A1 * | 12/2015 | .............. F16H 1/003 |

* cited by examiner

THRUST CHAIN DEVICE HAVING A TOOTHED SPROCKET WITH LONG ASYMMETRICAL TEETH

CROSS REFERENCE TO RELATED APPLICATIONS

The present application is a § 371 National Phase of International Patent Application Number PCT/FR2021/050845, filed May 16, 2021, which claims priority of French Patent Application Number FR2004905, filed May 17, 2020, the entire contents of all of which are incorporated by reference herein as if fully set forth.

FIELD OF THE INVENTION

The invention relates to thrust load moving machinery, and more particularly to transmission assemblies used in such machinery.

BACKGROUND

In fields where the motion of large loads over long strokes is required with limited space available, it is known to use chain driven machinery called rigid chains. FR 2 786 476, on behalf of the applicant, describes a hinged load lifting column implementing a rigid chain.

Rigid chain, or hinged bar, machinery allows a chain to be moved from a folded state in which it occupies a small overall size to an extended state as a rectilinear, rigid structure capable of supporting high compressive loads.

In comparison with cylinder, arm or pantograph systems, a rigid chain has a reduced overall size in the folded state for a long extension stroke.

Rigid chain machinery is, for example, used in the entertainment industry to move scenery or stage elements over long strokes, at high velocities. This type of machinery can also be used in production industries, for example for the assembly line production of products with high masses.

The operating stroke of rigid chains can be adapted to the operating environment by changing the number of links in the chain.

The applicant has identified a need for thrust chains with high power, low noise and vibration, longer life time and low maintenance.

The invention improves the situation.

SUMMARY

The applicant provides a thrust chain device, comprising a thrust chain comprising a straight portion along an axis and a curved portion, a thrust chain guide, a driving sprocket having teeth engaging the thrust chain, the driving sprocket being in contact with the thrust chain by involute contact surfaces, said contact surfaces belonging to the teeth, a tooth meshing with the chain by defining a line of action having an angle with the axis of the straight portion between −10° and 10°, in particular close to 0°. The chain comprises links hinged on axes. The line of action is offset from the hinge axes of links. The driving sprocket is in contact with the straight portion and without contact with the curved portion. The driving sprocket is rotatably mounted to an axis located on the side of the thrust chain opposite to the center of curvature of the curved portion. Said contact surfaces of each tooth comprise a convex front surface directed towards the straight portion when the tooth is engaged and a convexo-concave rear surface directed towards the curved portion when the tooth is engaged. The convex front surface occupies an angle greater than half the angle occupied by the tooth. Along the axis of the straight portion, the sprocket axis is disposed in a zone between a boundary between the curved portion and the straight portion and a maximum distance from said boundary. A tooth exerting a thrust force on an angle epsilon of rotation of the sprocket and having an angle sigma from one tooth to a next tooth with sigma equal to 360°/n, n being the number of teeth of the sprocket, the epsilon-sigma difference is greater than 30°.

The sum of the angles a occupied by the teeth and the angles b occupied by the rounded bottoms separating the teeth is equal to 360°. Thus a+b=360°/n, where n is the number of teeth. With a sprocket of prior art, the contact between the tooth and the chain by a roller of the chain takes place over an angle equal to a/2. This angle is equal to ½((360°/n)−b). With a sprocket according to the invention, the contact between the tooth and the chain by a roller of the chain takes place over an angle greater than a/2. This angle may exceed the value of a but is generally less than or equal to a. In other words, the angular position of the free end of the contact surface of a tooth may lie behind the tangent between the bottom and the rear surface of said tooth and, in general, remains ahead of the angular position of the center of the bottom.

When a tooth pushes a roller in the thrust chain in the clockwise direction, the linear velocity V of the roller along the axis Z is constant. At the contact point belonging to the contact surface, V=Wp·Ri, where Ri is the instantaneous radius or distance between the contact point and the axis of rotation of the sprocket and Wp is the instantaneous angular velocity at the contact point. R, is increasing and w is decreasing while the angular velocity of the sprocket is constant. This is made possible by the involute profile of the front surface or leading edge of the tooth forming the contact surface.

Such a device turns out to be interesting for lifting variable loads. Wear is reduced. The asymmetry of each tooth corresponds to the asymmetry of the trajectory of the rollers of the neighboring row of rollers of the sprocket, on either side of the plane passing through the axis of rotation of the sprocket and perpendicular to the straight portion of the thrust chain, i.e. towards the curved part and opposite to the curved part. In the straight portion, the distance between the axes of two successive rollers is constant. In the curved portion, the distance between the axes of two successive rollers is variable. Said distance increases away from the sprocket, reaches a maximum and then decreases towards the magazine portion. The increase in said distance in the half of the curved portion neighboring to the sprocket in a direction away from the sprocket allows mutual disengagement of the teeth and rollers while keeping a distance between the teeth and rollers in said curved portion of the thrust chain.

Such a transmission assembly allows the chain to be subjected to forces distributed over several teeth and at a place where the chain is guided. Components of the forces transmitted to the neighboring links other than that of the direction of translation of the chain are made negligible. The energy efficiency of the transmission is significantly higher than that of previously known transmissions. With the same number of sprocket teeth, the sprocket is able to transfer more force to the chain. In other words, with the same pitch diameter, the sprocket can receive more torque from the engine. The load on the chain can be increased. Vibration, wear and noise during operation are greatly reduced in comparison with known facilities.

The sprocket meshes with bars of the thrust chain. The bars are arranged in two rows, one on the internal side of the curved portion and the other on the external side of the curved portion. In this way, the change in pitch of the push chain bars externally to the curved portion is utilized to release the sprocket teeth.

In one embodiment, the diameter of the internal bars is reduced, for example by at least 20%, with respect to the diameter of the external bars. The space for the sprocket teeth is increased.

In one exemplary embodiment, the diameter of the internal bars is variable along the axis of said bar, for example a large diameter in the link plates and a small diameter in the center facing and away from the sprocket teeth.

In one embodiment, the gap between the rows of bars is increased to increase the length of the sprocket teeth.

The increase in tooth length is radial and in evolute. The increase in radial tooth length allows an increase in the angle occupied by the leading edge of the tooth. This can be increased from an angle of a/2 to an angle of 2a/3 or even 3a/4, even a, that is a leading edge occupying at least the angle of each tooth. This large increase reduces the load supported by each tooth for an equal number of teeth.

In one embodiment, said contact surfaces are rolling surfaces.

In one embodiment, said contact surfaces are sliding surfaces.

In one embodiment, the driving sprocket is a single sprocket. The driving sprocket may comprise one or more rows of teeth.

In one embodiment, driving sprockets are mounted to the same shaft.

In one embodiment, the epsilon—sigma difference is greater than 34°, more preferably greater than 40°.

In one embodiment, the epsilon—sigma difference is greater than 46° for sprockets with at most 12 teeth.

In one embodiment, the epsilon—sigma difference is greater than 49° for sprockets with at most 6 teeth.

In one embodiment, the radial dimension of the teeth is chosen such that at least two front surfaces of said driving sprocket are in simultaneous contact with the thrust chain over an angle of at least 200° for a 5-tooth sprocket, at least 250° for a 6-tooth sprocket, at least 300° for a 7-tooth sprocket, at least 340° for an 8-tooth sprocket.

In one embodiment, the radial dimension of the teeth is selected such that at least three front surfaces of said driving sprocket are in simultaneous contact with the thrust chain over an angle of at least 20° for a 9-tooth sprocket, at least 60° for a 10- or 11-tooth sprocket, at least 140° for a 12-tooth sprocket, at least 180° for a sprocket having 13-15 teeth, at least 260° for a sprocket having 16-24 teeth; at least 360° for a sprocket having 25 to 48 teeth.

In one embodiment, the sprocket comprises spur teeth including between 5 and 30 teeth. This number of teeth ensures good continuity of motion between the wheel and the chain and avoids uncontrolled motions when passing from one tooth to another and limits vibration and related noise.

In one embodiment, the sprocket comprises spur teeth having a module of between 3 and 64 millimeters.

In one embodiment, the push chain comprises links and axes to which the links are mounted, the axes being in contact with the teeth, at least two of the driving sprocket teeth being in contact with an axis in the straight portion, the number of teeth of the sprocket being at least 8 or even 9, the axis in the straight portion and the axis in the curved portion being of neighboring ranks.

In one embodiment, the chain includes links hinged to each other through bars. The bar is freely mounted to links of the chain. Rolling between the wheel and the bars is favored over friction. Wear during use of the transmission assembly is reduced.

In one embodiment, the axis of the driving sprocket is disposed along the axis of the straight portion, in an interval between the lower end of the straight portion and the lower end of the straight portion increased by the length of a link of the push chain, preferably between the lower end of the straight portion and the lower end of the straight portion increased by 150% of the length of a link of the push chain.

In one embodiment, the thrust chain guide is arranged on the side of the thrust chain opposite to the driving sprocket.

In one embodiment, the guide has a rectilinear thrust chain guide surface.

In one embodiment, an additional guide is arranged outwardly of the curved portion.

In one embodiment, the convex front surface is flat-free, each tooth has a tip and a radial axis, the tip being angularly offset from the axis towards the curved portion.

In one embodiment, the force exerted by one tooth on the thrust chain is transferred to the next tooth over a rotation stroke of the sprocket greater than a/2, preferably at least 3a/8, more preferably at least a. The force exerted by one of the teeth on the push chain is transferred to the next tooth over a rotation stroke of the driving sprocket of at least 40° per revolution for a 6-tooth sprocket;
25° per revolution for a 12-tooth sprocket;
16° per revolution for a 24-tooth sprocket;
12° per revolution for a 48-tooth sprocket.

In one embodiment, at least one of the bars comprises a substantially cylindrical body and at least one ring freely rotatably threaded around the body so as to form a guide and/or drive roller for the chain. The rollers then act as a wear part and can be quickly and easily replaced during maintenance operations without completely dismantling the chain, thus reducing maintenance costs.

In one embodiment, the axis of rotation of the sprocket is horizontal during operation.

In one embodiment, the thrust portion is rectilinear.

Said guide may comprise contact surfaces of synthetic material.

In one embodiment, the driving sprocket has a linear bearing capacity of between 80 and 600 mm or even 1000 mm. In comparison with a known sprocket, the gain in linear bearing capacity is greater than 60% for sprockets with 5 or 6 teeth, greater than 53% for sprockets with 7 to 12 teeth, greater than 47% for sprockets with 13 to 24 teeth, greater than 45% for sprockets with 25 to 48 teeth.

In one embodiment, the driving sprocket has an angle phi occupied by the tooth leading flank greater than 5 degrees, in particular for 48 teeth, preferably greater than 11 degrees, in particular for 24 teeth, more preferably greater than 23 degrees, in particular for 12 teeth, more preferably greater than 47 degrees, in particular for 6 teeth.

In one embodiment, the driving sprocket has a sprocket height positioning H between 0 and 1.5 pitch.

In one embodiment, the driving sprocket has a flange width Lj between 30 and 150 mm, preferably between 40 and 120 mm.

BRIEF DESCRIPTION OF THE DRAWINGS

Further characteristics, details and advantages of the invention will become apparent from the detailed description below, and from the appended drawings, in which.

DETAILED DESCRIPTION OF THE PREFERRED EMBODIMENTS

The following drawings and description contain, for the most part, elements of certainty. They may therefore not only serve to improve understanding of the present invention, but also contribute to its definition, where appropriate.

The profile of a sprocket meshing with a chain greatly differs from the profile of two gears meshing together. The chain has cylindrical bars of revolution contacting the teeth of the sprocket. The bars are freely mounted so that they can rotate in contact with the sprocket. The bar diameter and the distance between the axes of two consecutive bars are parameters of the chain that affect the sprocket. The sprocket is characterized in particular by the number of teeth, the diameter, the opening between two neighboring teeth and the thrust angle. FR 2 780 472 describes a thrust chain drive comprising a sprocket with rollers freely mounted between two flanges with teeth, one roller per sprocket tooth. The thrust chain is left free in its curved portion. Thrust is exerted on the axes of the chain in a direction away from the direction of translation of the chain.

The applicant seeks to reduce noise, vibration and wear. By achieving this goal, it is possible to expand areas likely to use push chains, for example, previously using other technologies, such as cable or belt.

To this end, the Applicant, beyond incremental improvements, sought to understand limitations of current mechanisms. Starting from the sprocket and chain form illustrated in FR 3 061 753, a good alignment between the line of action and the axis of the straight portion is profitable. In keeping with this property, it was found that the symmetry of each tooth about a plane passing through the axis of rotation was useful to ensure absence of geometric interference between the tooth and the chain and, of course, to achieve the desired drive contact. Thus, the tooth following the engaged tooth is free of interference with the next roller in the chain and gradually approaches to be in contact and then engaged in turn.

At this stage, the Applicant carried out extensive analysis of the vibratory phenomena and identified that a significant proportion of the vibration occurred during the abrupt departure of the sprocket profile when the load supported by the chain passes to the next tooth. It was therefore sought to provide a prolonged contact for simultaneous support by several teeth, thus distributing the load. For this, it was contemplated to increase the pitch diameter of the sprocket and the number of sprocket teeth, but this would imply an increase in the overall size of the sprocket, an increase in the driving torque of the sprocket at the same load and a change in motor system.

The applicant then sought a way to keep the pitch diameter of the sprocket and its number of teeth. It was designed to lengthen the teeth of the sprocket, to allow for an asymmetry of the teeth profile and to change positioning of the sprocket in the direction of the top surface of the curved portion. Lengthening the teeth poses an interference issue with the roller neighboring to the one with which the tooth will be engaged. Making the tooth asymmetrical also causes interference difficulties. Changing positioning of the sprocket towards the top surface of the curved portion tends to reduce the stroke during which there is operational roller-tooth contact. The applicant realized that it was desirable to guide the chain flange linearly in its vertical portion while exerting a thrust through the sprocket tooth. The curved portion is guided while being free of thrust by the sprocket tooth. It is desirable to avoid transmitting forces to the guide of the curved portion.

In the course of research, the applicant realized that there was a zone for positioning the sprocket in an interesting way. The axis of the sprocket is positioned at the same distance from the axis of the straight part of the chain as the axis of a previous sprocket with the same number of teeth and the same pitch diameter and cooperating with a chain of the same pitch and with rollers of the same diameter. The pitch is the distance, along the axis of the straight part, between two roller axes of the chain, in particular between two roller axes on the side of the chain near the sprocket.

In FR 3 061 753, the lowest contact point between a tooth and a roller is also located at a distance from the curved portion. In practice, said contact point was above the curved part. The axis of the sprocket 1 according to the invention is positioned along the axis of the straight part 10a of the chain at a small distance from the curved portion 10b. The lowest contact point between a tooth 2 and a roller 171 is distant from the curved part 10b. The lowest contact point between a tooth 2 and a roller 171 is above the curved part 10b, see in particular FIG. 7.

The axis of the sprocket 1 according to the invention is positioned along the axis of the straight part 10a of the chain 10 between the boundary 30 separating the curved part 10b and the straight part 10a and a distance greater than half a pitch from said boundary 30 opposite to the curved part 10b. Said distance may be between more than zero and one and a half pitch. An orthogonal reference frame XYZ is defined with X an axis parallel to the axis of rotation of the sprocket 1, Z the translation axis of the straight part 10a and Y an axis perpendicular to X and Z. The axes X and Y are horizontal and the axis Z vertical in most situations. In other words, the axis of the sprocket 1 is disposed in a zone between a boundary 30 separating the curved portion 10b and the straight portion 10a and a maximum distance from said boundary 30, the maximum distance being greater than zero, less than or equal to 1.5 pitch, preferably equal to half a pitch.

Said distance allows the leading flank 2a or load flank of a tooth 2 to support the roller(s) 171 located above the axis of the sprocket 1 over a higher angular path. Said distance also allows the roller 171 located in the curved part 10b to approach the leading flank 2a of a tooth 2 without interfering with the trailing flank 2b or the tip of the preceding tooth 2 whose leading flank 2a is already engaging the preceding roller 171, in the clockwise direction of rotation of the sprocket 1 corresponding in the figures to a rise in the chain. In the anti-clockwise direction, the roller 171 escapes in a direction opposite to the tooth 2. In other words, instead of the roller 171 continuing its travel along the straight portion 10a with a zero component along the axis Y as in prior art, the roller 171, according to the invention, has a non-zero velocity along the axis Y in the direction opposite to the velocity component along the axis Y of the corresponding tooth 2. The leading flank 2a has a convex profile. The curvature of the leading flank 2a is chosen to avoid a variation in chain velocity and a torque variation of the engine. The trailing flank 2b has a concave, partly concave and partly straight, or partly concave and partly convex, profile. The trailing flank 2b may have a profile that is partly symmetrical to the leading flank 2a in proximity to the base of the tooth 2, and partly concave away from the base of the tooth 2. In another embodiment, the profile of the trailing flank 2b is partly symmetrical to the leading flank 2a away from the end of the tooth 2 and partly concave in proximity to the end of the tooth 2, see FIGS. 4 and 7. The leading flank 2a or convex front surface occupies an angle greater than half the angle occupied by the tooth 2. The leading flank may occupy an angle greater than 5 degrees, in particular for 48 teeth. The leading flank may occupy an angle greater than 11 degrees, in particular for 24 teeth. The leading flank may occupy an angle of more than 23 degrees, in particular for 12 teeth. The leading flank may occupy an angle greater than 47 degrees, in particular for 6 teeth.

The leading flank 2a is oriented towards the straight part 10a. The trailing flank 2b is oriented towards the curved part 10b. The sprocket 1 can work in compression and traction.

The proximity of the transmitter or curved part 10b to the sprocket 1 along axis Y, the axis of the straight portion, makes it possible to take advantage of the opening of the chain links and thus to space apart the rollers 171 away from each other for the passage of a long tooth 2 between two successive rollers 171. The tooth 2 is long in that it is longer than the tooth of a known chain sprocket both radially and through its leading flank 2a. The leading flank 2a is extended in wrap around distance and angular overall size. The leading flank 2a angularly extends over a range greater than half the angular dimension of the tooth 2. For a 6-tooth sprocket, the leading edge 2a extends over more than 30°, or even more than 60°, preferably between 40 and 55°. For a 5-tooth sprocket, the leading edge 2a extends over 36° or even over 72°, preferably between 50 and 65°. For a 7-tooth sprocket, the leading flank 2a extends over more than 25°, or even more than 51°, preferably between 30 and 45°. For an 8-tooth sprocket, the leading edge 2a extends over 22.5° or even over 45°, preferably between 28 and 40°.

Thus, in the clockwise direction of rotation of the sprocket 1, a tooth 2 remains under the load of the roller over a longer angular path and for a longer period of time at the same speed of rotation. The loss of contact between a tooth 2 and the corresponding roller 171 is further away from the starting point of the leading flank 2a of the next tooth 2. Generalizing to a sprocket 1 with n teeth, each tooth 2 occupies an angle of 360°/n–b. In a simple hypothesis where each tooth 2 has a leading flank 2a occupying 75% of the angle a occupied by tooth 2, the leading flank 2a is angularly extended by 50%. If the leading flank 2a occupies 100% of the angle a occupied by the tooth 2, the leading flank 2a is angularly extended by 100% in comparison with a symmetrical tooth. The increase in the angular path during which a roller is driven by a tooth 2 makes it possible to provide simultaneous support of two rollers on two successive teeth and a smooth transition between zero support and maximum support for the incoming tooth 2 and between maximum support and zero support for the outgoing tooth 2.

The transition can be provided over an angular zone of several degrees. The angular zone of transition can be between 1°, preferably 5°, and the extension value of the leading flank 2a above, that is a/4 for an extension of 50%. Meshing becomes softer and smoother. Vibratory peaks have an acceleration reduced by at least 10 to 30%, a velocity reduced by at least 10 to 30% and a displacement reduced by at least 60 to 90% depending on the mode of operation in upward and downward direction and on the speed. The behavior of a sprocket 1 according to the invention is similar to that of a sprocket with one or two more teeth in terms of vibration while keeping the same torque required from the engine for a sprocket with 6 teeth and at least two more teeth for a sprocket with 12 or more teeth. Further, as vibration results in wear of the chain and sprocket surfaces, there is also a reduction in the burring phenomenon of the contact surfaces, resulting in a longer service life.

The thrust chain device comprises an open thrust chain. By open it is meant here a chain with separate ends. The chain comprises a straight portion or thrust portion 10a, a magazine portion 10c and a transmitter or curved portion 10b between the thrust portion 10a and the magazine portion 10c. The device includes a push chain guide 20 on the curved portion 10b. The straight portion is generally vertical and guided to take up transverse, generally horizontal forces. The device comprises a driving sprocket 1 with teeth 2 engaging the thrust chain in the straight portion 10a. The sprocket 1 comprises one or more rows of teeth 2. A row includes the teeth 2 located in a same plane. The device comprises a storage space for the magazine portion 10c. Said storage space may be parallel to the straight portion 10a and located opposite to the straight portion 10a with respect to the center of curvature of the curved portion 10b.

The driving sprocket 1 is engaging the thrust chain on the side opposite to the storage portion 10c, in compression and optionally in tension. The driving sprocket 1 is in contact with the thrust chain through involute surfaces, said surfaces belonging to the teeth 2, a tooth 2 meshing with the chain by defining a line of action having an angle with the thrust portion of between −10° and 10°, preferably in the vicinity of 0°.

Preferably, the line of action has an angle with the thrust portion of between −2° and 2°, still better between −1 and 1°. The forces undergone by the guide 20 are low, to a first approximation bounded by the sine of the above angle, that is less than 3.5% of the thrust force of the chain. The contact surfaces provide low friction and negligible wear to the chain while themselves experiencing wear compatible with spaced maintenance visits.

As illustrated in the figures, a toothed sprocket 1 is rotatably mounted about an axis parallel to the axis X. Circular meshing surfaces 100 belonging to the chain 10 are translationally mounted along an axis Z. Here, the term axis is used in its geometrical sense. In the case of the embodiments described above, the circular meshing surfaces 100 correspond to circular contours of bars 11 seen in a profile view. The axis X corresponds to the main direction of the drive shaft or sprocket axis. The axis Z corresponds to the vertical direction along which the circular meshing surfaces 100 carried by the bars 11 move.

The circular meshing surfaces 100, represented by circles whose centers are referenced $C_{n-1}$, $C_n$, and $C_{n+1}$, are directly carried by the body of the bars 11 without rings or by intermediate members, such as rollers, supported by the bodies of the bars 11 and forming drive rolls.

The axis of rotation of the sprocket 1 and the axis of translation of the circular meshing surfaces 100 are orthogonal and distant from each other by a distance equal to the pitch radius Rp.

During the meshing motion, at least two teeth 2 of the sprocket 1 are in contact with a circular meshing surface 100. Since the teeth 2 are spur teeth and the circular meshing surfaces 100 are movable orthogonally to the axis X, the contact is made on a line extending along the axis X. Seen in the plane of the figures, the contact can therefore be represented by a contact point referenced M. The connection is a rectilinear line connection.

In mechanics, one of the most common cases of motion transmission is that of transforming one rotational motion into another rotational motion. A known transmission comprises a first toothed sprocket with spur teeth and a second toothed sprocket with spur teeth meshing together to form a spur gear to transform a first rotation into a second rotation. In the literature, this simple gear type serves as a reference for defining other gear types. Some technical terms will be used, by analogy, to describe the thrust chain gear.

In the present case, the assembly transforms a rotational motion about the axis X into a translational motion along the axis Z. In this respect, the device is analogous to a rack and sprocket gear. However, the circular meshing surfaces 100 differ from the profile of conventional racks. Meshing between profiles of teeth 2 on the one hand and circular meshing surfaces 100 on the other hand therefore provides the gear of the device with meshing properties distinct from rack and sprocket gears. Here, the bars 11 perform two distinct functions, namely:

to form or carry the circular meshing surfaces 100 that contact the teeth 2 of the sprocket 1, and to ensure a good connection between the two plates 121 of a same link and thus to ensure a good stability of the chain.

The sprocket 1 meshes with the rectilinear, here vertical, straight portion. Therefore, the motion of the bars 11 during meshing is a translation in the upper part and a rotation in the lower part. This complex translational and rotational motion distinguishes the gear of the chain 10 from conventional systems comprising a closed chain with a curved portion wrapped around a toothed pulley, such as traction chain coupling systems or bicycle drive systems, as well as push chains in which only a rectilinear part is in engagement with the sprocket. The sprocket 1 meshes on the face of the straight portion 10a and the curved portion 10b opposite to the center of curvature of the curved portion 10b. The magazine portion 10c is disposed in a storage space.

In summary, meshing of the chain 10 can be assimilated with neither of that of conventional rack and roller chains.

The combination of the complex rectilinear and pivotal motion and the circular profile of the bars 11 provides the meshing of the transmission assembly 1 with high vibratory performance—low amplitude vibrations—allowing either high speed, high load, quiet operation, compact drive or a combination of the above, particularly adapted to rigid chain machinery.

The axis Z corresponds to the contact line along which the tangential speed of the sprocket 1 is equal to the linear speed of the circular meshing surfaces 100. Therefore, the pitch radius Rp or distance separating the contact line and the axis of rotation of the sprocket 1 can be equated to the pitch radius of the sprocket 1 equal to half the pitch diameter Dp. The line of contact can be assimilated to the pitch line of the straight portion 10a of the chain 10 by analogy with a rack and sprocket gear. The pitch radius of the sprocket 1 is the distance between the axis of rotation of the sprocket 1 and the axis of the roller at the closest point to said axis of rotation, i.e. in the position where the axis of the roller is in the X-Y plane passing through said axis of rotation. The modulus m of the sprocket 1 and the modulus m of the chain 10 are equal. The pitch p of sprocket 1 and the pitch of chain 10 are equal. The pitch p is defined as the length of the arc taken on the pitch circle of the sprocket 1 between two points of similar meshing flanks of two successive teeth 2. The pitch p and the modulus m are related by the following equality: p=m*Pi.

During meshing, contact is established between the meshing flank of the profile of a tooth 2 and the circular meshing surfaces 100. In a profile view, the contact between two convex surfaces defines a tangent line represented in the figures by a contact tangent 181. The contact tangent 181 is dashed. During meshing, the contact point M moves along a theoretical straight line called the line of action and referenced 182. Mechanically, the line of action 182 represents the direction of the forces transmitted from one meshing member to the other via the contact point M.

The line of action 182 is substantially perpendicular to the contact tangent 181. In conventional two-toothed wheel gears with conjugate involute profiles, the contact tangent forms a pressure angle with the direction of the center line, i.e. the straight line connecting the centers of both toothed wheels. The line of action thus forms a pressure angle ±Pi/2 with the direction of the center line.

In rack-and-toothed wheel gears with conjugate involute profiles, the rack can be regarded as a toothed wheel of infinite radius. The straight line extending in the direction of translation of the rack and corresponding to the pitch circle of the toothed wheel of infinite radius is then called the reference line or pitch line. In this case, the line of action forms a pressure angle with the reference line. The contact tangent thus forms a pressure angle ±PV/2 with the reference line.

Teeth with a conjugate involute profile, whether they are wheel-and-wheel or rack-and-wheel gears, have improved properties in comparison with the first obstacle transmission systems, in particular those attributed to Leonardo da Vinci. A first property is that the transmission is substantially homokinetic: if the velocity of one of the gear members is constant, then the velocity of the other member is also constant. A second property is that the pressure angle is substantially constant during meshing, within the machining tolerances and the phenomena of beginning and end of contact. A third property is to promote rolling contact without slippage between two convex surfaces. The transmission of motion is therefore continuous and homogeneous. Further, friction wear is limited.

In order to withstand high forces and to avoid embrittlement of the rack, the involute teeth are generally truncated. Stated differently, the radial end of each tooth is clipped and machining of the tooth gullet (between two teeth) is not carried out to the gullet. Thus, the teeth have a substantially flattened or rounded radial end rather than a sharp tip and the tooth gullet has a substantially corresponding female shape for the same reasons. These adaptations of the conjugate involute profiles also limit specific sliding phenomena. On the other hand, the operating interference that occurs at the beginning and end of the contact between two conjugate teeth, also called the approach phase and withdrawal phase, in known mechanisms, is here dealt with by positioning the sprocket 1 low so that the approach phase takes place in the curved portion 10b of the chain 10. Said low positioning makes it possible to limit clipping of the teeth 2.

The value of the pressure angle is generally set by standards. This value is, for example, nominally 20° according to European standards and 25° according to US standards. Some, in particular old, gears exceptionally allow for a value of 14.5°. Setting a standard value further allows gear members such as wheels and racks to be manufactured (machined) with a single tool. Stated differently, designing a gear with a pressure angle different from standard ones would mean designing a dedicated machining tool, which is complex and expensive. Finally, gear design is usually carried out by means of charts relating a large number of parameters such as number of teeth, modulus, etc. These charts are established on the basis of a standard pressure angle. It is generally not advisable for a technician to deviate from this.

In the embodiments, the teeth 2 of the sprocket 1 operatively cooperate with bars 11 having a circular meshing profile. Specific sliding and operating interference phenomena are avoided here, including during the approach and withdrawal phases.

The sprocket 1 comprises, for example, between five and thirty teeth 2. In the examples, the sprocket 1 is shaped as a six-tooth wheel 2. The sprocket 1 is similar in shape to that of a toothed wheel with an involute profile conjugate with a rack with a pitch p. The teeth 2 have a leading flank 2a and a trailing flank 2b. The concept of leading and trailing flanks relates to the force exerted between the sprocket 1 and the chain 10. The teeth 2 are substantially pointed. The pitch radius Rp of the sprocket 1 is adjusted so that the pressure angle at the contact point is substantially zero. Here, the pitch radius Rp is smaller than the distance corresponding to a standard pressure angle of 20° or 25°. The value of the pitch radius Rp is selected according to the dimensions of the members, in particular the diameter of the bars 11 and the pitch p. For example, the pitch p is between 10 and 200 millimeters. The modulus m is between 10/Pi and 200/Pi millimeters, that is between about 3 and 64 millimeters. Also, R is the radius of the curved portion 10b, rg is the radius of the rollers 171, D is the diameter of the circle having as its center the axis of rotation of a roller 171 of the row opposite to the sprocket 1 and passing through the axes of rotation of the neighboring rollers 171 of the row close to the sprocket 1.

The following table sets forth some examples of pitch radius values Rp, given in millimeters, as a function of the pitch p given in millimeters in the left-hand column and the number n of teeth indicated in the first row.

TABLE 1

| Nb n of teeth | 6 | 8 | 9 | 10 | 12 | 15 |
|---|---|---|---|---|---|---|
| p = 20 mm | 15.915 | 19.099 | 25.465 | 28.648 | 31.831 | 38.197 | 47.746 |
| p = 30 mm | 23.873 | 28.648 | 38.197 | 42.972 | 47.746 | 57.296 | 71.620 |
| p = 40 mm | 31.831 | 38.197 | 50.930 | 57.296 | 63.662 | 76.394 | 95.493 |
| p = 50 mm | 39.789 | 47.746 | 63.662 | 71.620 | 79.577 | 95.493 | 119.366 |
| p = 60 mm | 47.746 | 57.296 | 76.394 | 85.944 | 95.493 | 114.592 | 143.239 |
| p = 80 mm | 63.662 | 76.394 | 101.859 | 114.592 | 127.324 | 152.789 | 190.986 |
| p = 90 mm | 71.620 | 85.944 | 114.592 | 128.916 | 143.239 | 171.887 | 214.859 |
| P = 100 mm | 79.577 | 95.493 | 127.324 | 143.239 | 159.155 | 190.986 | 238.732 |

The combinations of values provided are exemplary embodiments of the invention. They correspond to a pressure angle whose absolute value is close to zero.

The gear represented, comprising the teeth 2 of the sprocket 1 and the conjugate circular meshing surfaces 100, therefore has a pressure angle alpha of substantially zero. In other words, the line of action forms a substantially zero angle with the direction of translation of a thrust portion 10a of the chain 10. The line of action is substantially parallel to the axis Z. The contact tangent forms a substantially right angle (pressure angle±Pi/2) with the direction of translation of the pushing portion 10a of the chain 10. In practice, given the machining tolerances, the angle is less than 5° in absolute value.

In alternatives, the pressure angle has an absolute value less than the aforementioned standard values but greater than 0. For example, the pressure angle may be between −10° and 10°, or between −5° and 5°, between −2° and 2°, or between −1 and 10°. The contact tangent 181 then forms an angle (alpha ±Pi/2) with the direction of translation of the thrust portion 10a of the chain 10 of between 80° and 100°, between 85° and 95°, between 88° and 92°, between 89° and 91° respectively.

In the examples represented, the space between the circular meshing surfaces 100 carried by the bars 11 is free. There is no "bottom" connecting one external bar 11 to another. The motion of the teeth 2 of the sprocket 1 during the meshing motion is free.

Figure 1:
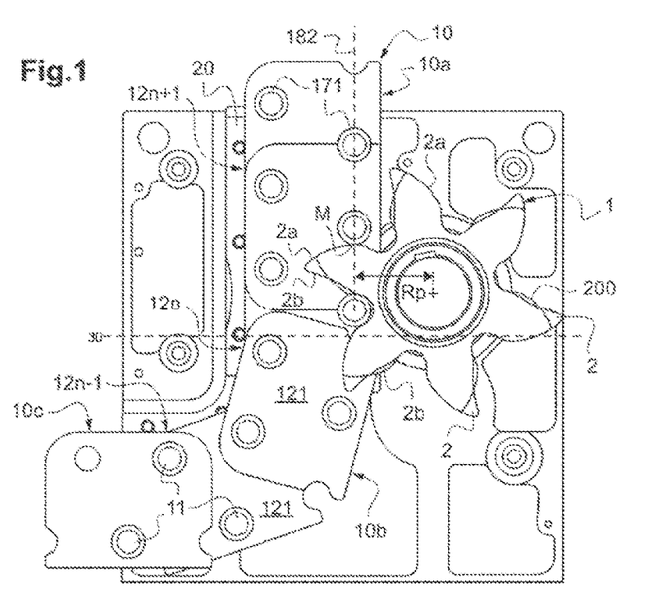
FIG. 1 is a side view of a rigid chain device according to one aspect of the invention, with a 6-tooth sprocket, the profile of a conventional sprocket being also represented for explanatory purposes.

Here, the radial end of the teeth 2 is pointed in theory and machined with a fillet in production. The radial end of the teeth 2 is not clipped. According to the invention, it is sought to achieve several simultaneous contacts, preferably one or two more than in prior art in which a single contact was sought to reduce vibration and parasitic noise, see FIG. 1. Furthermore, when the contact point Mn+1 approaches the end of a tooth 2n+1, at the top in the figures, a new contact point Mn is already established between the next tooth 2n/circular mesh surface 100n pair, and so on. The leading edge occupies a significant angular sector greater than half the angular sector of a tooth 2 and may theoretically extend beyond the angular sector of a tooth 2, although in practice the angular sector of a tooth 2 is generally a limit facilitating design of the tooth 2. Thus, when the contact point Mn+1 approaches half the angular sector of a tooth 2n+1, a new contact point Mn is established between the next tooth 2n/circular mesh surface 100n pair, and so on. The force is shared and gradually transferred to the new pair 2n/100n, resulting in a reduction in the derivative of the forces at the contact point M and thus in vibration.

In the example represented, the gullets of the tooth 2 of the sprocket 1 are machined to a substantially circular profile with a diameter equal to or greater than the diameter of the circular meshing surfaces 100. Thus, within the machining tolerances, each circular meshing surface 100 is accommodated into a gullet between two teeth 2 before being driven by the downstream tooth 2.

In the examples described here, the bars 11 are freely mounted with respect to the links 12 of the chain 10. Thus, during meshing, rolling of the external bar 11 against the meshing surface of the tooth 2 is facilitated. Friction is reduced. Wear of the bars 11, like that of the teeth 2, is reduced. Alternatively, the bars 11 are fixedly mounted to one of the two links 12 they connect. In this case, and when contact is made directly on a rotationally locked circular meshing surface 100, sliding phenomena occur during meshing. Thereby, the manufacture of the chain 10 may nevertheless be facilitated. For example, a link 12 and an external bar 11 may be formed in one piece or welded together.

The device as described so far generates few radial forces in the gear. The radial forces are essentially oriented in the direction Y. This further stabilizes the chain 10 during its motion and avoids vibration transmitted to the chain 10 by the sprocket 1, in particular when high velocities are implemented.

The general operating principles, in particular the kinematics of the machinery, are described in FR 2 786 476 the reader is invited to consult.

The chain 10 includes links 12. The links 12 are hinged to each other so as to form the chain 10. The chain 10 fitted to the device forms a motion transmission member. In the following, the links 12 are identified by an index 1 to N from the tail link 121 to the head link 12N carrying a hooking plate. The index n refers to a link 12n or the part of a link 12n. Within this context, the term link is to be understood as the elementary mechanical pattern reproduced identically along the chain 10. The link 12n is connected to a link 12n-1 on the one hand and to a link 12n+1 on the other hand, with 1<n<N.

During ascent, that is clockwise rotation of the sprocket 1, a link 12n successively belongs to the magazine portion 10c, to the curved portion 10b and then to the straight portion 10a of the chain 10, and vice versa during descent.

The device also includes a stationary guide 20. The guide 20 forms a rolling surface for the guide rollers 171 described hereinafter. The guide 20 may comprise a part forming a rolling surface made of a low wear material. The guide 20 has a first straight portion corresponding to the straight portion 10a, a second straight portion corresponding to the magazine portion 10c and a curved portion 10b corresponding to the curved portion 10b. The guide 20 provides an outwardly directed rolling surface, the curved portion 10b being convex. The curved portion 10b connects to the first straight portion at one end and to the second straight portion at the other end smoothly, stated differently without a singular point of the derivative. The curved portion 10b forms a transmission member. In the embodiment represented, the curved portion 10b is a semicircle with constant radius.

When the sprocket 1 is rotating counterclockwise, the chain 10 is pushed towards the storage magazine by each of the teeth 2 contacting the chain 10. When the sprocket 1 is rotating clockwise, the chain 10 is upwardly pushed by each of the teeth 2 of the chain 10 and pulled out of the magazine. There occurs contact making at start of meshing, and contact leaving at end of meshing, the straight portion 10a being loaded.

The chain 10 may be of the type described in FR 2 780 472 to which the reader is invited to refer.

The chain 10 comprises a plurality of successive links 12. The links 12 are hinged about bars 11 forming transverse axes. Each link 12 comprises two substantially parallel flanges or pairs of parallel plates 121. Each plate 121 has three holes pierced therethrough, for receiving the hinge axes, and two notches forming half-holes. Each plate 121 defines a front transverse active face and a rear transverse active face to be supported respectively on a rear transverse active face of an anterior link plate 121 and a front transverse active face of a posterior link plate 121 when the links 12 are in a straight line, in particular within the straight portion 10a of the chain 10. Each plate 121 is arranged in a YZ plane. One of the plates 121 is disposed inside the link, the other plate 121 is mounted outside the link, symmetrically with respect to a YZ plane. The internal plate 121 neighboring to the external plate 121 of the same link is hinged to a common bar 11. Said internal plate 121 neighboring to an external plate 121 of the neighboring link is hinged to a further common bar 11. Said common bars are disposed on the side opposite to the sprocket 1. On the side of the sprocket 1, each bar 11 is connected to an alternately internal and external plate 121.

The axes or hinge bars of the links 12 are provided with guide rollers 171 at each end. The guide rollers 171 are located outwardly of the plates 121. The guide rollers 171 cooperate with side guide rails provided on side flanges of a housing forming part of the guide 20 in the push and magazine portions, and with a deflection member in the connecting portion.

Figure 2:
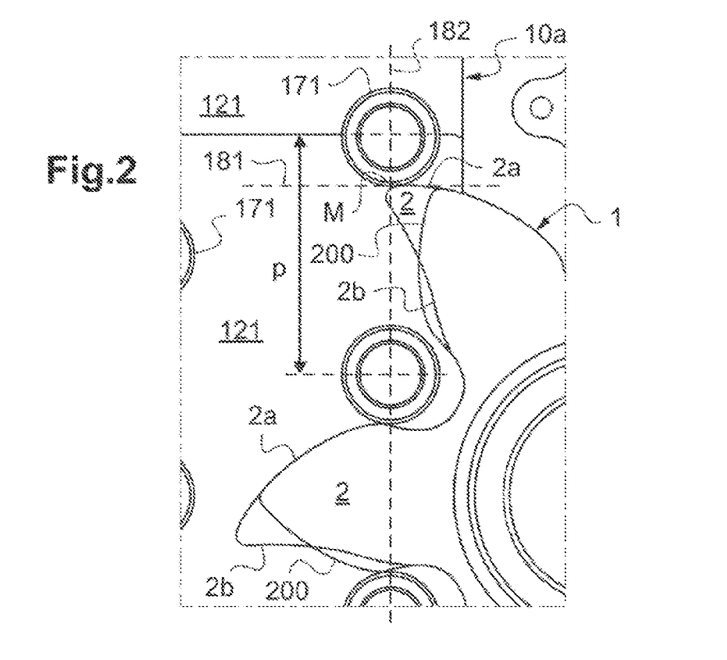
FIG. 2 is a detail view of FIG. 1 at a different sprocket angular position.
Figure 3:
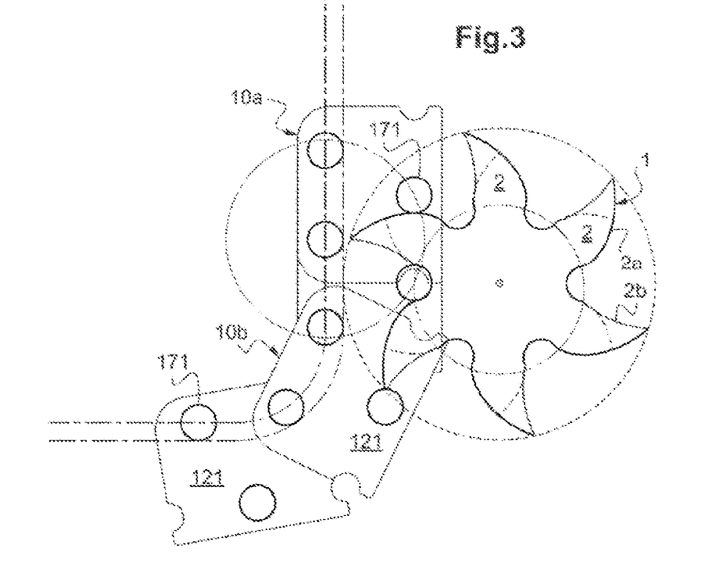
FIG. 3 is a side view of a rigid chain device with a sprocket whose leading edge occupies a first additional angle.

For improved legibility, the profile of conventional teeth 200 has also been represented in the figures. In FIG. 3, the profile of the teeth 2 has been elongated to a theoretical maximum radius called the external radius and corresponding to the intersection of the leading edge 2a with the trailing edge 2b. The maximum radius is equal to the distance between the axis of rotation of the sprocket 1 and the external surface of the rollers 171 of the row of rollers distal to the sprocket 1. If the maximum radius were greater than said distance, then there would be interference between the teeth 2 and the rollers 171 of the row of rollers opposite to the sprocket 1. In practice, a safety margin is taken. The actual radius of the sprocket 1 is chosen to be smaller than the maximum radius by a distance F of several millimeters. This avoids a sharp angle between the leading flank 2a and the trailing flank 2b is avoided, which is dangerous for operators, and the ends of the teeth 2 are rounded off, as in FIGS. 1 and 2. Another way to avoid such interference is to mount the axis of rotation of the sprocket 1 closer to the boundary plane 30 between the straight portion 10a and the curved portion 10b. FIG. 3 makes it possible to comprehend that the wrap around length of the leading edge 2a can be more than 70% of the pitch radius, preferably 95%, more preferably more than 130%.

In one embodiment, the leading edge 2a with an involute profile stops at the intersection of the axis passing through the center of the concave fillet of the next tooth 2. This avoids a geometrical overlap of a tooth 2 over the next one. However, such an overlap is possible as an alternative by varying the dimensions of the chain flange along the axis Z.

In practice, the maximum diameter Dmax of a sprocket according to the invention with n teeth and a chain pitch p is equivalent to the Dmax of a standard symmetrical sprocket with n/2 teeth and a chain pitch 2p.

The length of the involute profile of a tooth 2 of a sprocket 1 according to the invention with n teeth is therefore equivalent to the length of the involute profile of a symmetrical tooth of a known sprocket with n/2 teeth and chain pitch 2p.

The sprocket e according to the invention has a tooth bearing capacity 2 as long as that of a tooth with a doubled pitch but has a pitch diameter divided by two.

For the understanding of FIGS. 4 to 7, the following variables are named:

TABLE 2

| Designation | Definition | Unit | Calculation |
|---|---|---|---|
| n | Number of sprocket teeth | | |
| sigma | Tooth to tooth angle | . | $sigma = \dfrac{360}{n}$ |
| phi | Geometric angle of the involute | ° | phi = sigma − psi |
| psi | Angle—start of the involute/center of the intermediate circle | ° | |
| alpha | Design angle for determining the end of the involute and corresponding to the linear bearing capacity | ° | alpha = tan(alpha) − inv(alpha) |
| epsilon | Angle of rotation of the sprocket corresponding to a tooth linear bearing capacity | ° | epsilon = alpha + phi |
| A | Arc of circle corresponding to angle ψ | mm | |
| C | Chord length corresponding to arc a (=r) | mm | |
| Dp | Pitch diameter of the sprocket | mm | |
| Dmax | Maximum diameter of the sprocket (Rmax radius) | mm | $D_{max} = 2 \times \dfrac{R_p}{\cos(alpha)}$ |
| Rp | Pitch radius of the sprocket | mm | |
| Rci | Radius of the intermediate circle between two teeth (roller passage) | mm | |
| Rr | 90° transmission radius | mm | |
| Zp | Passage width for the tooth | mm | |
| p | Chain pitch | mm | |
| $P_l$ | Linear bearing capacity of a tooth | mm | |

The following table compares trigonometric variables obtained according to the above formulas between a meshing sprocket 1 according to the invention and a conventional sprocket. The pitch p, the number n of teeth, the radius of the intermediate circle between two teeth Rci are input parameters. The pitch diameter Dp of the sprocket and the increase Delta PI of linear bearing capacity PI between a meshing sprocket 1 according to the invention and a conventional sprocket are calculated from the input parameters. The distances are expressed in mm.

TABLE 3

| p | n | Rci | Dp | Delta PI | Epsilon Sigma |
|---|---|---|---|---|---|
| 20 | 5 | 5 | 31.8 | 74% | 46.03 |
| 20 | 6 | 5 | 38.2 | 71% | 46.74 |
| 20 | 7 | 5 | 44.6 | 69% | 46.87 |
| 20 | 8 | 5 | 50.9 | 66% | 46.73 |
| 20 | 9 | 5 | 57.3 | 65% | 46.46 |
| 20 | 10 | 5 | 63.7 | 63% | 46.07 |
| 20 | 11 | 5 | 70.0 | 62% | 45.62 |
| 20 | 12 | 5 | 76.4 | 61% | 45.18 |
| 20 | 13 | 5 | 82.8 | 61% | 44.74 |
| 20 | 14 | 5 | 89.1 | 60% | 44.27 |
| 20 | 15 | 5 | 95.5 | 59% | 43.80 |
| 20 | 24 | 5 | 152.8 | 55% | 40.11 |
| 20 | 48 | 5 | 305.6 | 50% | 34.06 |
| 30 | 5 | 9 | 47.7 | 86% | 41.49 |
| 30 | 6 | 9 | 57.3 | 82% | 42.79 |
| 30 | 7 | 9 | 66.8 | 79% | 43.39 |
| 30 | 8 | 9 | 76.4 | 76% | 43.58 |
| 30 | 9 | 9 | 85.9 | 74% | 43.54 |
| 30 | 10 | 9 | 95.5 | 73% | 43.36 |
| 30 | 11 | 9 | 105.0 | 72% | 43.09 |
| 30 | 12 | 9 | 114.6 | 70% | 42.78 |
| 30 | 13 | 9 | 124.1 | 70% | 42.45 |
| 30 | 14 | 9 | 133.7 | 69% | 42.08 |
| 30 | 15 | 9 | 143.2 | 68% | 41.71 |
| 30 | 24 | 9 | 229.2 | 64% | 38.58 |
| 30 | 48 | 9 | 458.4 | 59% | 32.91 |
| 40 | 5 | 9 | 63.7 | 70% | 48.27 |
| 40 | 6 | 9 | 76.4 | 67% | 48.68 |
| 40 | 7 | 9 | 89.1 | 64% | 48.60 |
| 40 | 8 | 9 | 101.9 | 62% | 48.32 |
| 40 | 9 | 9 | 114.6 | 61% | 47.89 |
| 40 | 10 | 9 | 127.3 | 60% | 47.41 |
| 40 | 11 | 9 | 140.1 | 59% | 46.91 |
| 40 | 12 | 9 | 152.8 | 58% | 46.34 |
| 40 | 13 | 9 | 165.5 | 57% | 45.87 |
| 40 | 14 | 9 | 178.3 | 56% | 45.30 |
| 40 | 15 | 9 | 191.0 | 55% | 44.82 |
| 40 | 24 | 9 | 305.6 | 52% | 40.90 |
| 40 | 48 | 9 | 611.2 | 47% | 34.64 |
| 50 | 5 | 11 | 79.6 | 69% | 48.72 |
| 50 | 6 | 11 | 95.5 | 66% | 49.06 |
| 50 | 7 | 11 | 111.4 | 64% | 48.96 |
| 50 | 8 | 11 | 127.3 | 62% | 48.63 |
| 50 | 9 | 11 | 143.2 | 60% | 48.18 |
| 50 | 10 | 11 | 159.2 | 59% | 47.68 |
| 50 | 11 | 11 | 175.1 | 57% | 47.13 |
| 50 | 12 | 11 | 191.0 | 57% | 46.61 |
| 50 | 13 | 11 | 206.9 | 56% | 46.06 |
| 50 | 14 | 11 | 222.8 | 55% | 45.56 |
| 50 | 15 | 11 | 238.7 | 55% | 45.01 |
| 50 | 24 | 11 | 382.0 | 51% | 41.09 |
| 50 | 48 | 11 | 763.9 | 47% | 34.67 |
| 80 | 5 | 16 | 127.3 | 66% | 50.50 |
| 80 | 6 | 16 | 152.8 | 63% | 50.60 |
| 80 | 7 | 16 | 178.3 | 61% | 50.31 |
| 80 | 8 | 16 | 203.7 | 59% | 49.36 |
| 80 | 9 | 16 | 229.2 | 58% | 49.31 |
| 80 | 10 | 16 | 254.6 | 56% | 48.73 |
| 80 | 11 | 16 | 280.1 | 55% | 48.14 |
| 80 | 12 | 16 | 305.6 | 54% | 47.53 |
| 80 | 13 | 16 | 331.0 | 54% | 46.98 |
| 80 | 14 | 16 | 356.5 | 53% | 46.40 |
| 80 | 15 | 16 | 382.0 | 52% | 45.83 |
| 80 | 24 | 16 | 611.2 | 49% | 41.70 |
| 80 | 48 | 16 | 1222.3 | 46% | 35.19 |
| 100 | 5 | 20 | 159.2 | 66% | 50.50 |
| 100 | 6 | 20 | 191.0 | 63% | 50.60 |
| 100 | 7 | 20 | 222.8 | 61% | 50.31 |
| 100 | 8 | 20 | 254.6 | 59% | 49.86 |
| 100 | 9 | 20 | 286.5 | 58% | 49.31 |
| 100 | 10 | 20 | 318.3 | 56% | 48.73 |
| 100 | 11 | 20 | 350.1 | 55% | 48.14 |
| 100 | 12 | 20 | 382.0 | 54% | 47.53 |
| 100 | 13 | 20 | 413.8 | 54% | 46.98 |
| 100 | 14 | 20 | 445.6 | 53% | 46.40 |
| 100 | 15 | 20 | 477.5 | 52% | 45.83 |
| 100 | 24 | 20 | 763.9 | 49% | 41.70 |
| 100 | 48 | 20 | 1527.9 | 46% | 35.19 |

TABLE 3-continued

| p | n | Rci | Dp | Delta PI | Epsilon Sigma |
|---|---|-----|-----|----------|---------------|
| 150 | 5 | 30 | 238.7 | 66% | 50.50 |
| 150 | 6 | 30 | 286.5 | 63% | 50.60 |
| 150 | 7 | 30 | 334.2 | 61% | 50.31 |
| 150 | 8 | 30 | 382.0 | 59% | 49.86 |
| 150 | 9 | 30 | 429.7 | 58% | 49.31 |
| 150 | 10 | 30 | 477.5 | 56% | 48.73 |
| 150 | 11 | 30 | 525.2 | 55% | 48.14 |
| 150 | 12 | 30 | 573.0 | 54% | 47.53 |
| 150 | 13 | 30 | 620.7 | 54% | 46.98 |
| 150 | 14 | 30 | 668.5 | 53% | 46.40 |
| 150 | 15 | 30 | 716.2 | 52% | 45.83 |
| 150 | 24 | 30 | 1145.9 | 49% | 41.70 |
| 150 | 48 | 30 | 2291.8 | 46% | 35.19 |

Increase in bearing capacity

The above results clearly show that the bearing capacity of a sprocket 1 tooth 2 according to the invention is greater than that of a conventional sprocket tooth, thus allowing a greater multiplicity of simultaneous contacts between the teeth 2 of the sprocket 1 and the rollers 171 of the thrust chain 10, while avoiding increasing in the number of teeth 2 of the sprocket 1 and therefore its pitch diameter.

Figure 4:
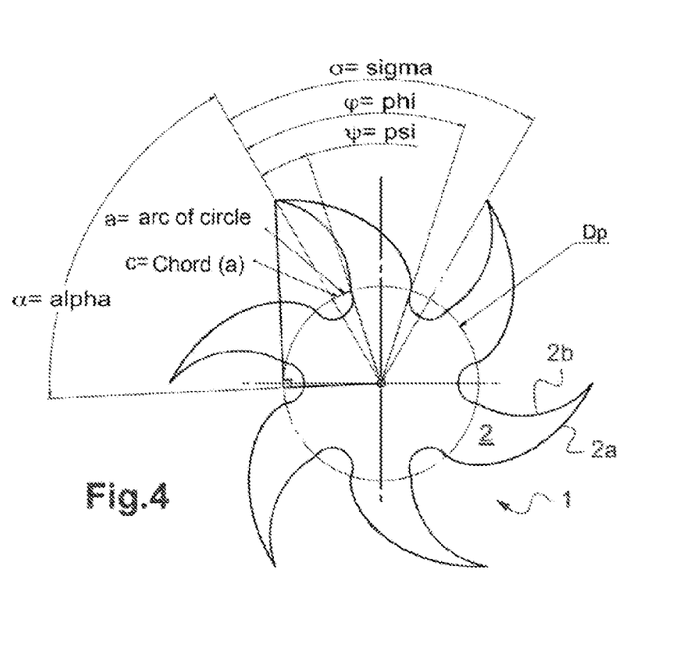
FIG. 4 is a side view of a sprocket whose leading edge occupies a second additional angle.
Figure 5:
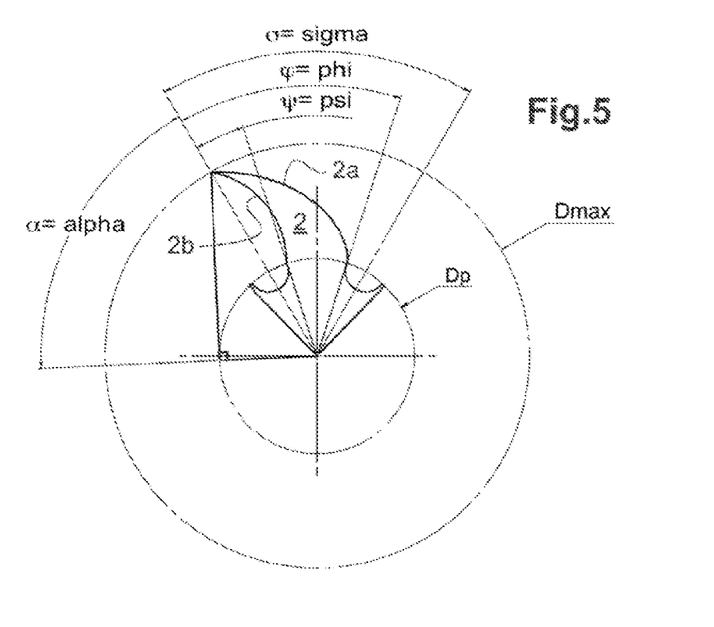
FIG. 5 is a side view of a sprocket with one tooth isolated for visibility of dimensional parameters.

In FIG. 4, the teeth 2 have been lengthened as much as possible while avoiding interference with the rollers 171 of the internal row. The linear bearing capacity gain of the leading edge 2a is at least 60%. The linear bearing capacity can be between 80 and 1000 mm, in particular greater than 120 mm, preferably greater than 180 mm, in particular for 12 teeth, or even 300 mm for 24 teeth.

Figure 6:
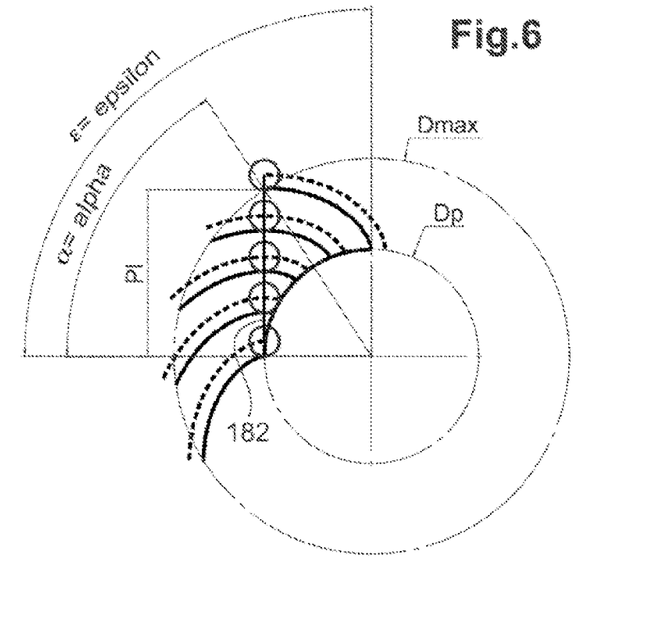
FIG. 6 is a side view of a sprocket whose linear bearing capacity of a tooth and several successive positions of a tooth are shown.

In FIG. 6, the linear bearing capacity has been extended to the maximum while avoiding interference with the rollers 171 of the internal row, for a thrust chain 10 with more widely spaced rows of rollers 171. The linear bearing capacity gain of the leading edge 2a is at least 80%. Increasing the distance between the rows of rollers 171 is interesting for increasing the angular bearing capacity. This can lead to an increase in the width of the flanges, resulting in increased inertia and stability. The width of the flanges Lj is between 30 and 150 mm, preferably between 40 and 120 mm.

The applicant has identified several parameters that reflect the invention and allow quantitative comparison. The epsilon—sigma difference reflects the increase in the unit bearing capacity of a tooth. The epsilon-sigma difference of a sprocket according to the invention is greater than 34°, more preferably greater than 40°. For sprockets with at most 12 teeth, the epsilon-sigma difference may be greater than 46°. For sprockets with at most 6 teeth, the epsilon-sigma difference may be greater than 49°.

Figure 7:
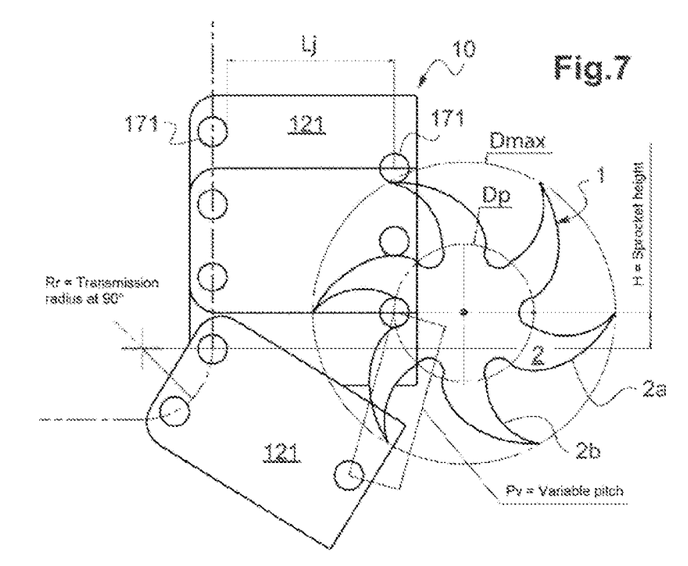
FIG. 7 is a side view of a rigid chain device with a sprocket, pitch and height illustrated, the chain flange width is greater than those in FIG. 3.
Figure 8:
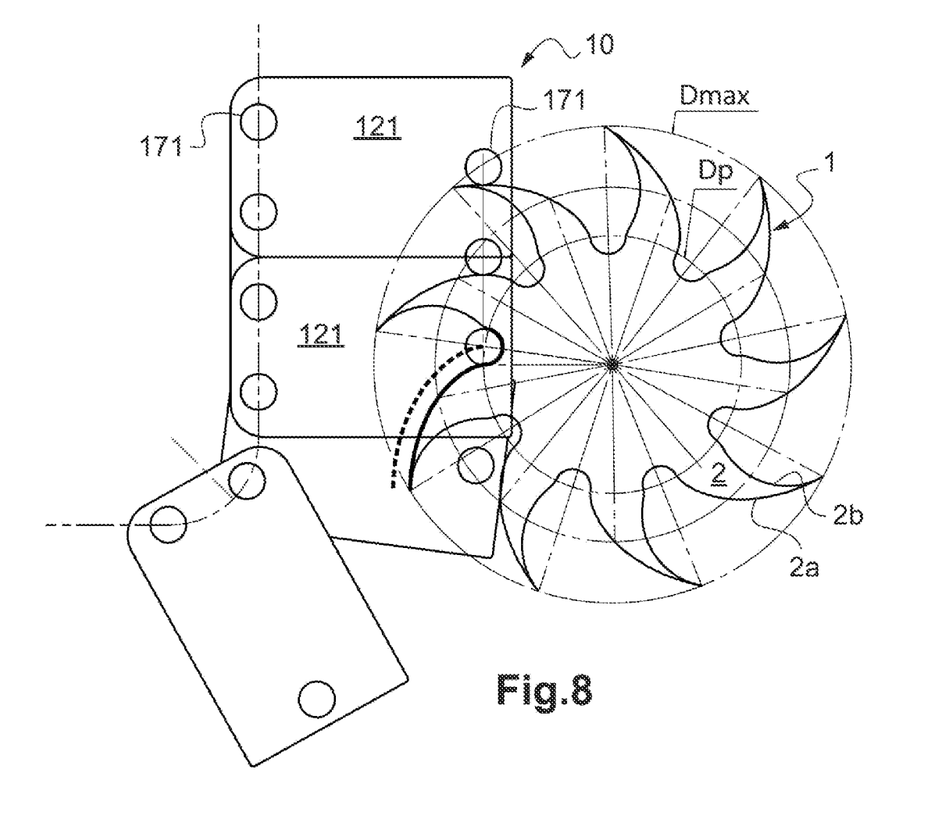
FIG. 8 is a side view of a rigid chain device with a 9-tooth sprocket.

In FIG. 7, the height H defining the vertical position of the sprocket 1 in relation to the boundary 30 between the curved part 10b and the straight part 10a has been represented. This height is between 0 and one and a half pitch. The height H is dependent on the definition of the parameters Lj, Dmax and R so that the involute of the tooth 2 can pass freely between each roller 171 spaced by a variable pitch Pv, varying due to the pivoting of the flanges in the curved portion. The variable pitch Pv is present at least in the zone framed by a thinly drawn tilted rectangle in FIG. 7. The pitch is constant in the straight portion(s). In the curved portion, the pitch increases from the straight portion, reaches a maximum at a plateau or peak and decreases towards the magazine portion.

The transmission assembly may take the form of a module or an assembly kit in parts. For example, two identical chassis with identical drives may be compatible with magazines and/or chains having different lengths. A kit may include several chains or optional links to be added/removed.

The invention is not limited to the above-described transmission assemblies and machinery, by way of example only, but encompasses all alternatives that may be contemplated by the person skilled in the art.

The invention claimed is:

1. A thrust chain device, comprising a thrust chain (10) comprising a straight portion (10a) along an axis and a curved portion (10b), the thrust chain comprising links (12) hinged on axes, a thrust chain guide (20), a driving sprocket (1) provided with teeth (2) engaging the thrust chain, the driving sprocket (1) being in contact with the thrust chain through involute contact surfaces (2a), said contact surfaces (2a) belonging to the teeth (2), a tooth (2) meshing with the chain (10) by defining a line of action having an angle with the axis of the straight portion (10a) of between −10° and 10°, the line of action being offset with respect to the hinge axes of links (12), the driving sprocket (1) is in contact with the straight portion (10a) and without contact with the curved portion (10b), the driving sprocket (1) is rotatably mounted to an axis located on an opposite side of the thrust chain to the center of curvature of the curved portion (10b), and said contact surfaces (2a) of each tooth (2) comprise a convex front surface directed towards the straight portion (10a) when the tooth (2) is engaged and a rear surface directed towards the curved portion when the tooth (2) is engaged, the convex front surface occupying an angle greater than one half the angle occupied by the tooth (2) and the axis of the sprocket (1) is disposed, along the axis of the straight portion (10a), in a zone between a boundary between the curved portion (10b) and the straight portion (10a) and a maximum distance from said boundary (30), a tooth (2) exerting a thrust force on an angle of rotation epsilon of the sprocket (1) and having an angle sigma from one tooth to a next tooth with sigma equal to 360°/n, n being the number of teeth of the sprocket (1), and the epsilon-sigma difference is greater than 30°.

2. The device according to claim 1, wherein the thrust chain comprises rolling surfaces or sliding surfaces in contact with the teeth (2), the driving sprocket (1) is a single sprocket or driving sprockets are mounted to the same shaft, and the epsilon-sigma difference is greater than 34°, for sprockets with at most 12 teeth, and greater than 49° for sprockets with at most 6 teeth.

3. The device according to claim 1, wherein the radial dimension of the teeth (2) is chosen such that at least two front surfaces of said driving sprocket (1) are in simultaneous contact with the thrust chain (10) over an angle of at least 200° for a 5-tooth sprocket, at least 250° for a 6-tooth sprocket, at least 300° for a 7-tooth sprocket, at least 340° for an 8-tooth sprocket, and such that at least three front surfaces of said driving sprocket (1) are in simultaneous contact with the thrust chain (10) over an angle of at least 20° for a 9-tooth sprocket, at least 60° for a 10- or 11-tooth sprocket, at least 140° for a 12-tooth sprocket, at least 180° for a 13- to 15-tooth sprocket, at least 260° for a 16- to 24-tooth sprocket, and at least 360° for a 25- to 48-tooth sprocket.

4. The device according to claim 1, wherein the driving sprocket (1) is a single sprocket or driving sprockets are mounted to the same shaft.

5. The device according to claim 1, wherein the push chain comprises links and axes on which the links are mounted, the axes being in contact with the teeth (2), at least two of the teeth (2) of the driving sprocket (1) being in contact with an axis in the straight portion (10a), the number of teeth (2) of the sprocket (1) being at least 8 or 9, the axis in the straight portion (10a) and the axis in the curved portion (10b) being of neighboring ranks.

6. The device according to claim 1, wherein the axis of the driving sprocket (1) is disposed along the axis of the straight portion (10a), in an interval between the lower end of the straight portion (10a) and the lower end of the straight portion (10a) increased by the length of a link of the thrust chain, between the lower end of the straight portion (10a) and the lower end of the straight portion (10a) increased by 150% of the length of a push chain link.

7. The device according to claim 1, wherein the thrust chain guide (20) is disposed on the side of the thrust chain opposite to the driving sprocket (1), the guide (20) has a rectilinear thrust chain guide surface, and an additional guide is disposed outwardly of the curved portion (10b).

8. The device according to claim 1, wherein the force exerted by one of the teeth (2) on the push chain is transferred to the next tooth (2) over a rotation stroke of the driving sprocket (1) of at least 40° per revolution for a 6-tooth sprocket, 25° per revolution for a 12-tooth sprocket, 16° per revolution for a 24-tooth sprocket and 12° per revolution for a 48-tooth sprocket.

9. The device according to claim 1, wherein the convex front surface is flat-free, each tooth (2) has a rounded tip and a radial axis, the rounded tip being angularly offset from the axis towards the curved portion (10b), and the rear surface is convex-concave.

10. The device according to claim 1, wherein the driving sprocket (1) is provided with 5 to 30 involute teeth (2) rotatably mounted about an axis, and the chain (10) comprises bars (11), at least one of the bars (11) being engaging the driving sprocket (1), and the driving sprocket (1) comprises spur teeth with a modulus m of between 3 and 64 millimeters.

11. The device according to claim 1, wherein the driving sprocket (1) has a linear bearing capacity of between 80 and 1000 mm, an angle (phi) occupied by the leading edge of the tooth of greater than 5 degrees, a positioning of the sprocket in height H of between 0 and 1.5 pitch, and a width of the flanges Lj of between 40 and 120 mm.

* * * * *